(12) United States Patent
Li (10) Patent No.: US 9,880,414 B2
(45) Date of Patent: Jan. 30, 2018

(54) ARRAY SUBSTRATE, LIQUID CRYSTAL DISPLAY PANEL AND DISPLAY DEVICE

(71) Applicant: BOE Technology Group Co., Ltd., Beijing (CN)

(72) Inventor: Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 132 days.

(21) Appl. No.: 14/771,354

(22) PCT Filed: Mar. 18, 2015

(86) PCT No.: PCT/CN2015/074455
§ 371 (c)(1),
(2) Date: Aug. 28, 2015

(87) PCT Pub. No.: WO2016/070542
PCT Pub. Date: May 12, 2016

(65) Prior Publication Data
US 2016/0363812 A1 Dec. 15, 2016

(30) Foreign Application Priority Data
Nov. 7, 2014 (CN) .......................... 2014 1 0642435

(51) Int. Cl.
*G02F 1/1335* (2006.01)
*G02F 1/1341* (2006.01)
(Continued)

(52) U.S. Cl.
CPC ...... *G02F 1/133528* (2013.01); *G02F 1/1341* (2013.01); *G02F 1/133514* (2013.01);
(Continued)

(58) Field of Classification Search
CPC ......... G02F 1/134363; G02F 1/133528; G02F 2001/133565; G02F 2201/121; G02F 2201/123; G02F 1/133548
See application file for complete search history.

(56) References Cited

U.S. PATENT DOCUMENTS 6,798,464 B2 9/2004 Bietsch et al.
8,947,623 B2 2/2015 Kong et al.
(Continued)

FOREIGN PATENT DOCUMENTS

CN 101290446 A 10/2008
CN 101390000 A 3/2009
(Continued)

OTHER PUBLICATIONS

Aug. 16, 2016—(CN)—First Office Action Appn 201410642435.6 with English Tran.
(Continued)

*Primary Examiner* — Jessica M Merlin
(74) *Attorney, Agent, or Firm* — Banner & Witcoff, Ltd.

(57) ABSTRACT

An array substrate, a liquid crystal display panel and a display device are provided. The array substrate comprises: a base substrate, a data line and a gate line intersecting with each other on the base substrate, a plurality of pixel regions defined by the data line and the gate line on the array substrate and arranged in array, and a wire grid polarizing film arranged in respective pixel regions and configured for changing natural light passing therethrough into linearly polarized light; wherein, the wire grid polarizing film in the respective pixel regions has a grating structure, so the wire grid polarizing film plays a role of polarizer, and therefore, a process of separately attaching a polarizer after cell-
(Continued)

assembling is omitted, which can improve production efficiency, save production cost, and be conducive to thinning the display panel.

13 Claims, 4 Drawing Sheets

(51) Int. Cl.
    *G02F 1/1343*     (2006.01)
    *G02F 1/1362*     (2006.01)
    *G02F 1/1368*     (2006.01)

(52) U.S. Cl.
    CPC .. *G02F 1/134363* (2013.01); *G02F 1/136286* (2013.01); *G02F 1/1368* (2013.01); *G02F 1/13439* (2013.01); *G02F 1/136213* (2013.01); *G02F 2001/133548* (2013.01); *G02F 2001/133565* (2013.01); *G02F 2001/136295* (2013.01); *G02F 2201/121* (2013.01); *G02F 2201/123* (2013.01)

(56) References Cited

U.S. PATENT DOCUMENTS

| | | | |
|---|---|---|---|
| 2006/0061519 A1* | 3/2006 | Fisher | G02F 1/133528 345/32 |
| 2008/0017884 A1 | 1/2008 | Jeong et al. | |
| 2008/0094547 A1 | 4/2008 | Sugita et al. | |
| 2008/0100781 A1 | 5/2008 | Choo et al. | |
| 2008/0198318 A1* | 8/2008 | Lee | G02F 1/134363 349/141 |
| 2009/0283768 A1* | 11/2009 | Wang | G02F 1/133536 257/59 |
| 2009/0290105 A1* | 11/2009 | Takada | G02F 1/133528 349/96 |
| 2012/0057106 A1* | 3/2012 | Park | G02F 1/133528 349/96 |
| 2015/0014693 A1* | 1/2015 | Lee | H01L 27/124 257/72 |

FOREIGN PATENT DOCUMENTS

| | | |
|---|---|---|
| CN | 101960535 A | 1/2011 |
| CN | 104330915 A | 2/2015 |
| JP | 2010160504 A | 7/2010 |
| JP | 5067434 B2 | 11/2012 |

OTHER PUBLICATIONS

Jun. 29, 2015—International Search Report and Written Opinion Appn PCT/CN2015/074455 with English Tran.
Jan. 16, 2017—(CN) copy Second Office Action Appn 201410642435.6 with English Tran.

\* cited by examiner

ARRAY SUBSTRATE, LIQUID CRYSTAL DISPLAY PANEL AND DISPLAY DEVICE

The application is a U.S. National Phase Entry of International Application No. PCT/CN2015/074455 filed on Mar. 18, 2015, designating the United States of America and claiming priority to Chinese Patent Application No. 201410642435.6 filed on Nov. 7, 2014. The present application claims priority to and the benefit of the above-identified applications and the above-identified applications are incorporated by reference herein in their entirety.

TECHNICAL FIELD

Embodiments of the present disclosure relate to an array substrate, a liquid crystal display panel and a display device.

BACKGROUND

A liquid crystal display panel mainly consists of an array substrate, an opposed substrate and liquid crystal molecules located between the array substrate and the opposed substrate. In a production process, after respective film layers on the array substrate and the opposed substrate are fabricated, the array substrate and the opposed substrate are cell-assembled, and then polarizers are attached to upper and lower surfaces of the liquid crystal display panel, respectively, and finally a backlight module is further arranged on a side of the array substrate of the liquid crystal display panel, to form a display panel.

It can be seen that, the above production process of forming a liquid crystal display panel is relatively complicated, and it is necessary to paste polarizers after cell-assembling, which is not conducive to improving production efficiency. In addition, it is necessary to provide film attaching machines for attaching polarizers respectively, which will also increase production cost. Finally, the polarizers attached to outer side of the display panel have certain thickness, which will limit overall thickness of the resulted liquid crystal display panel, so thus disadvantageous for development of lighter and thinner devices.

SUMMARY

Embodiments of the present disclosure relate to an array substrate, a liquid crystal display panel and a display device, so as to thin a display panel, reduce production cost and simplify production process.

At least one embodiment of the present disclosure provides an array substrate, comprising: a base substrate; a data line and a gate line intersecting with each other on the base substrate, a plurality of pixel regions defined by the data line and the gate line on the array substrate and arranged in array, and a wire grid polarizing film arranged in respective pixel regions and configured for changing natural light passing therethrough into linearly polarized light; wherein, the wire grid polarizing film in the respective pixel regions has a grating structure.

For example, the grating structure consists of metal wires arranged linearly.

For example, the grating structure has a grating pitch less than half of a minimum wavelength of visible light.

For example, the grating pitch is 60 nm-100 nm.

For example, the wire grid polarizing film and the data line or the gate line are arranged on a same layer and insulated from each other.

For example, in the respective pixel regions, the wire grid polarizing film functions as a pixel electrode and is electrically connected with a drain electrode of a thin film transistor located on an intersection of the data line and the gate line.

For example, in the respective pixel regions, the wire grid polarizing film functions as a pixel electrode and a common electrode of an interdigital structure, the wire grid polarizing film functioning as the pixel electrode is electrically connected with a drain electrode of a thin film transistor located on an intersection of the data line and the gate line.

For example, the drain electrode and the data line are arranged on a same layer.

For example, the wire grid polarizing film functioning as the pixel electrode is arranged on a same layer as the data line, or the wire grid polarizing film functioning as the pixel electrode and the common electrode of the interdigital structure is arranged on a same layer as the data line.

For example, the common electrode is arranged above a film layer of the data line.

For example, in the respective pixel regions, a transparent conductive metal oxide layer is arranged on the wire grid polarizing film.

For example, in the respective pixel regions, the transparent conductive metal oxide layer and the wire grid polarizing film are consistent in pattern.

For example, the wire grid polarizing film and the gate line are arranged on a same layer, the wire grid polarizing film functions as a common electrode in the respective pixel regions.

For example, a pixel electrode is further arranged in the respective pixel regions; the wire grid polarizing film is electrically connected with the pixel electrode in the respective pixel regions.

For example, the array substrate further comprising a common electrode line arranged on a same layer as the gate line and extended in a same direction as the gate line; wherein, the wire grid polarizing film is electrically connected with the common electrode line in the respective pixel regions.

An embodiment of the present disclosure further provides a liquid crystal display panel, comprising: an array substrate and an opposed substrate arranged oppositely, and a liquid crystal layer filled between the array substrate and the opposed substrate; wherein, the array substrate is the array substrate provided by the embodiments of the present disclosure.

For example, an upper polarizer is arranged on a side of the opposed substrate away from the array substrate; for example, an extending direction of the grating structure of the wire grid polarizing film and a transmission axis direction of the upper polarizer are parallel to each other.

An embodiment of the present disclosure further provides a display device, comprising any liquid crystal display panel provided by the embodiments of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

The embodying modes for an array substrate, a liquid crystal display panel and a display device provided by the embodiments of the present disclosure are described in detail hereinafter in conjunction with the accompanying drawings.

Sizes and shapes of respective film layers and regions in the accompanying drawings do not reflect true proportions of the array substrate, but are only intended to illustrate content of the embodiments of the present disclosure.

Figure 1:
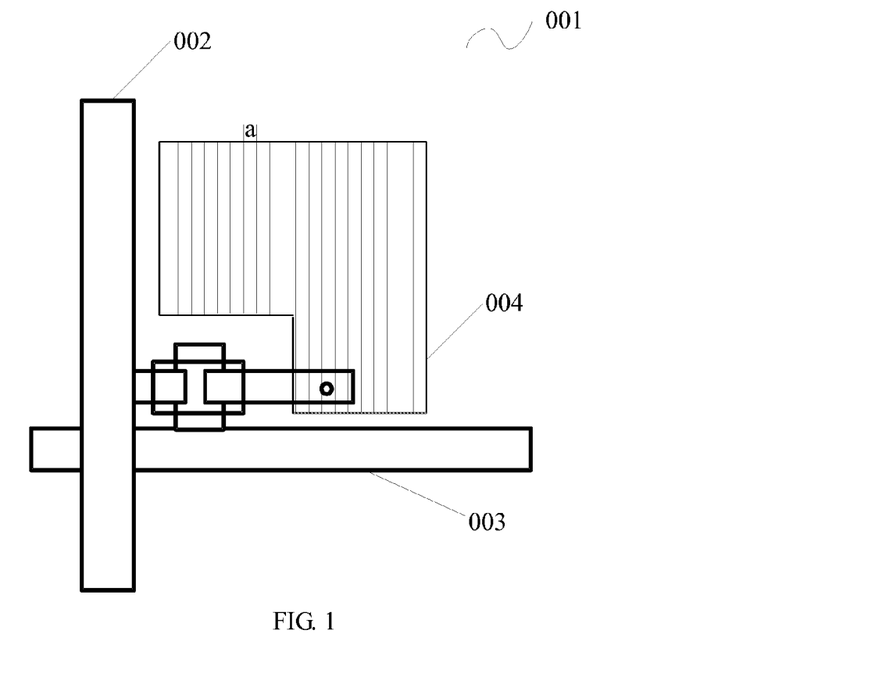
FIG. 1 is a top view of an array substrate provided by an embodiment of the disclosure.

FIG. 1 is a top view of an array substrate provided by an embodiment of the disclosure, and the array substrate comprises a base substrate 001 and a data line 002 and a gate line 003 intersecting with each other on the base substrate 001; on the array substrate, a plurality of pixel regions arranged in array are defined by the data line 002 and the gate line 003. FIG. 1 only shows respective parts in one pixel region; and in the respective pixel regions, a wire grid polarizing film 004 is further arranged for changing natural light pass therethrough to linearly polarized light.

The wire grid polarizing film 004 in the respective pixel regions has a grating structure.

For example, the wire grid polarizing film 004 usually adopts a grating structure consisting of metal wires arranged linearly; along an extending direction of the metal wires, free electrons can be driven by an electric field to consume electric energy, while an electric field perpendicular to the metal wires will not be absorbed. Therefore, light components perpendicular to the direction of the metal wires are transmitted, while the light components parallel to the metal wires are absorbed, and finally natural light becomes linearly polarized light after passing through the wire grid polarizing film 004. Thus, a wire grid polarizing film fabricated in respective pixel regions in an array substrate, instead of a polarizer attached on an outer side of the array substrate, can be used for changing natural light pass therethrough into linearly polarized light. When ensuring normal display of the liquid crystal display panel, the embodiment of the present disclosure can form a wire grid polarizing film which plays a role of polarizer in a fabrication process of an array substrate, and therefore, a separate process of attaching a polarizer after cell-assembling is omitted, which can improve production efficiency, save production cost, and be conducive to thinning the display panel.

In general, a wavelength of visible light is between 400 nm-800 nm; in order to ensure that the wire grid polarizing film 004 can polarizing natural light, a grating pitch a in a grating structure should be less than half of a minimum wavelength of visible light. For example, the grating pitch a of the wire grid polarizing film 004 is set to be less than 200 nm. For example, in order to make the wire grid polarizing film 004 better change natural light pass therethrough into linearly polarized light, the grating pitch a may be set between 60 nm-100 nm.

For example, the grating structure of the wire grid polarizing film 004 in the array substrate provided by the embodiment of the present disclosure can be formed by processes of coating a photoresist, exposing and developing, etching and so on. For example, exposure and development can be completed by a laser interference exposure method. That is, laser with a specific wavelength is used for irradiating photoresist from two directions of angle θ to form interference fringes for exposing. A concave-convex grid structure with various intervals in the wavelength range of the used laser can be obtained by changing θ, i.e., a grating structure is formed. Of course, the grating structure of the wire grid polarizing film 004 can also be formed by nanoimprint, which is not described in detail here.

For example, since in the array substrate provided by the embodiment of the present disclosure, the wire grid polarizing film 004 serving as a polarizer is usually made of metal material, and, the wire grid polarizing film 004 arranged in respective pixel regions often overlaps with effective display regions of the respective pixel regions. Therefore, the wire grid polarizing film 004 does not overlap with the data line 002 or the gate line 003. In actual operation, the wire grid polarizing film 004 may be set to be arranged on a same layer as the data line 002 or the gate line 003 and insulated from each other, so the wire grid polarizing film 004 can be fabricated without adding an additional patterning process to the original fabrication process of the array substrate, to save production cost and improve production efficiency.

On this basis, the wire grid polarizing film 004 in the array substrate provided by the embodiment of the present disclosure can be further function as a pixel electrode, a common electrode or a storage capacitor besides a polarizer. The multiplex function of the wire grid polarizing film 004 is described by a few specific embodiments hereinafter.

Embodiment I

Figure 2A:
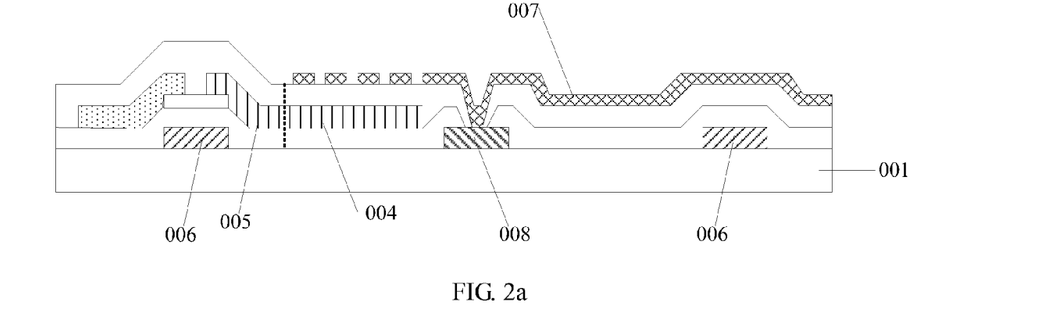
FIG. 2a to FIG. 2d are structural schematic diagrams of Embodiment I, respectively.
Figure 2B:
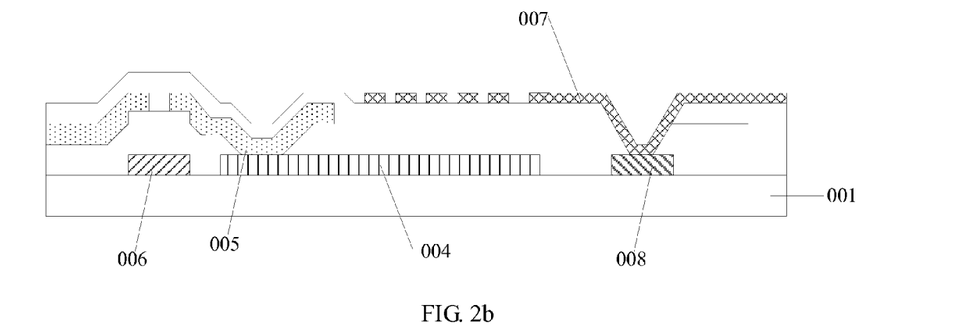

In an array substrate of the embodiment, as shown in FIG. 2a and FIG. 2b, a pixel electrode are the same as a wire grid polarizing film. For example, the wire grid polarizing film 004 in the respective pixel regions also functions as the pixel electrode, which is electrically connected with a drain electrode 005 of a thin film transistor located on an intersection of the gate line 003 and the data line 002, and the drain electrode 005 is usually arranged on the same layer as the data line 002.

For example, in the case that the wire grid polarizing film 004 is arranged on the same layer as the data line 002, as shown in FIG. 2a, because the wire grid polarizing film 004 serving as a pixel electrode is fabricated on the same layer as the drain electrode 005 of the thin film transistor, the wire grid polarizing film 004 and the drain electrode 005 can be directly electrically connected. In the case that the wire grid polarizing film 004 is arranged on the same layer as the gate line 003, as shown in FIG. 2b, because the wire grid polarizing film 004 serving as a pixel electrode is fabricated on the same layer as the gate electrode 006 of the thin film transistor which is not on the same layer as the drain electrode 005, the wire grid polarizing film 004 and the drain electrode 005 can be electrically connected through a via hole.

For example, during the fabrication of the array substrates with the structures shown in FIG. 2a and FIG. 2b, the wire grid polarizing film 004 serving as the pixel electrode is formed along with the formation of the data line 002 or the gate line 003, which can omit a separate pixel electrode commonly formed on the drain electrode. Thus, the numbers of used masks and the fabrication processes can be reduced.

Figure 2C:
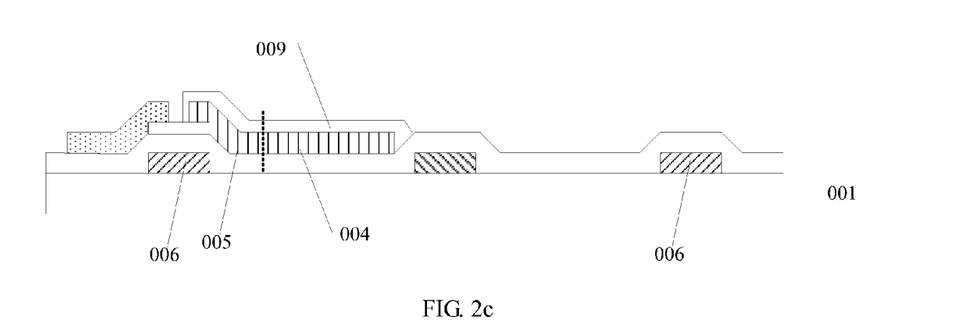
Figure 2D:
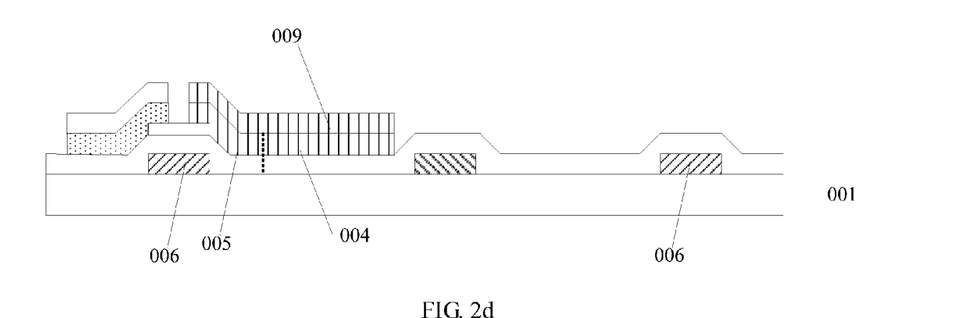

Further, in the embodiment of FIG. 2a and FIG. 2b, ADS mode array substrate is taken as an example. Thus, a common electrode 007 is further arranged above a film layer of the data line 002, and the common electrode 007 is connected with a common electrode line 008 through a via hole, and the common electrode line 008 is usually arranged on the same layer as the gate line 003. If the wire grid polarizing film 004 is made of easily oxidized metal such as Al, the common electrode 007 arranged above can prevent the wire grid polarizing film 004 from being oxidized. Thus, it is not necessary to separately arrange a protective layer to protect the wire grid polarizing film 004 in the ADS mode array substrate. However, in TN mode array substrate, if the wire grid polarizing film serving as a pixel electrode and the data line are arranged on the same layer, no common electrode protects the wire grid polarizing film 004 which is easily oxidized. Therefore, in order to better prevent the fabricated wire grid polarizing film 004 from being oxidized, for example, in respective pixel regions, as shown in FIG. 2c, a transparent conductive metal oxide layer 009, e.g., an ITO film layer, is arranged on the wire grid polarizing film 004. Further, since the transparent conductive metal oxide layers 009 arranged on the wire grid polarizing films 004 in different pixel regions need to be separated from each other, it is inevitable to pattern the added transparent conductive metal oxide layer 009, which will add a production process for the array substrate. In order to avoid the additional production process for the array substrate, for example, in the respective pixel regions, the transparent conductive metal oxide layer 009 and the wire grid polarizing film 004 are set to be consistent in pattern, as shown in FIG. 2d. In this way, by one patterning process, the patterns of the transparent conductive metal oxide layer 009 and the wire grid polarizing film 004 can be formed at the same time, without increasing the number of used masks.

Embodiment II

Figure 3A:
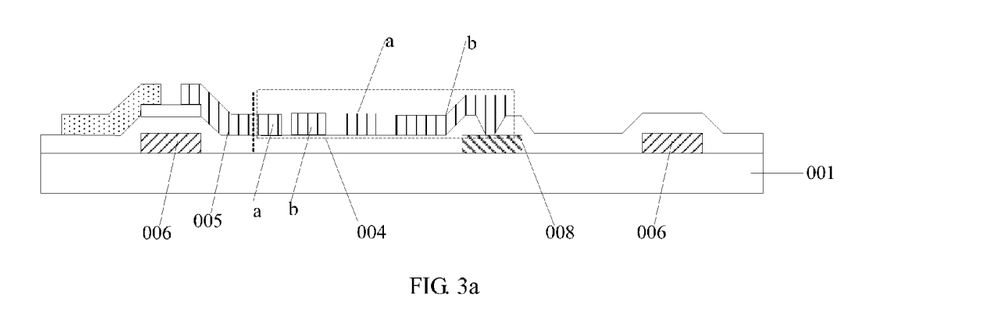
FIG. 3a and FIG. 3b are structural schematic diagrams of Embodiment II, respectively.
Figure 3B:
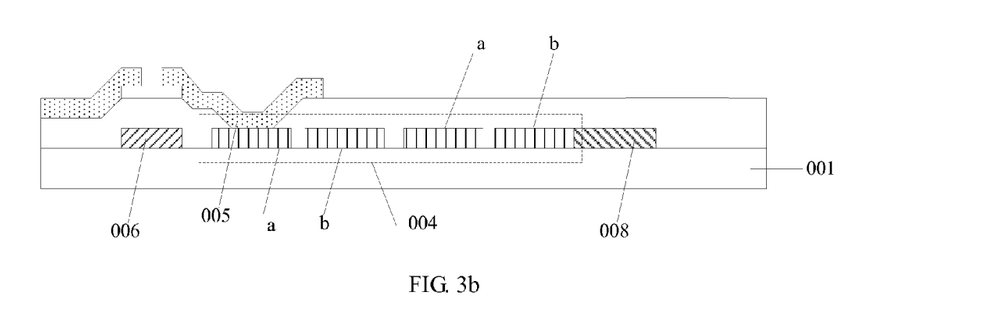

In an IPS mode array substrate of the embodiment, as shown in FIG. 3a and FIG. 3b, a pixel electrode and a common electrode are the same as a wire grid polarizing film. For example, in each pixel unit of the IPS mode array substrate, a pixel electrode and a common electrode are interdigitated and arranged on the same layer. Therefore, in the respective pixel regions, the wire grid polarizing film 004 also functions as the pixel electrode and the common electrode of interdigital structure; the wire grid polarizing film 004 functioning as the pixel electrode is electrically connected with a drain electrode 005 of a thin film transistor located on an intersection of the data line 002 and the gate line 003, and the drain electrode 005 and the data line 002 are arranged on the same layer.

For example, in the case that the wire grid polarizing film 004 is arranged on the same layer as the data line 002, as shown in FIG. 3a, because the wire grid polarizing film 004 serving as the pixel electrode and the common electrode is fabricated on the same layer as the drain electrode 005 of the thin film transistor, part a of the wire grid polarizing film 004 serving as the pixel electrode can be directly electrically connected with the drain electrode 005, and part b of the wire grid polarizing film 004 serving as the common electrode can be connected with a common electrode line 008 through a via hole, and the common electrode line 008 is arranged on the same layer as the gate line 003 and the gate electrode 006. In the case that the wire grid polarizing film 004 is arranged on the same layer as the gate line 003, as shown in FIG. 3b, because the wire grid polarizing film 004 serving as the pixel electrode and the common electrode is fabricated on the same layer as the gate electrode 006 of the thin film transistor, part a of the wire grid polarizing film 004 serving as the pixel electrode is electrically connected with the drain electrode 005 through a via hole, and part b of the wire grid polarizing film 004 serving as the common electrode is directly connected with the common electrode line 008, and the common electrode line 008 is arranged on the same layer as the gate line 003 and the gate electrode 006.

For example, during fabrication of the IPS mode array substrate as shown in FIG. 3a and FIG. 3b, the wire grid polarizing film 004 serving as the pixel electrode and the common electrode is formed along with the formation of the data line 002 or the gate line 003, which can omit a pixel electrode and a common electrode separately formed on the drain electrode. Thus, the numbers of used masks and the fabrication processes can be reduced.

Further, in the case that the wire grid polarizing film 004 serving as the pixel electrode and the common electrode is arranged on the same layer as the data line 002, no protection is provided above the wire grid polarizing film 004 which is easily oxidized. Therefore, in order to better prevent the fabricated wire grid polarizing film 004 from being oxidized, for example, a conductive oxide layer may also be added in the same manner used in Embodiment I. That is, in respective pixel regions, a transparent conductive metal oxide layer, e.g., an ITO film layer, is arranged on the wire grid polarizing film 004. Similarly, in order to avoid an additional production process for the array substrate, for example, in the respective pixel regions, the transparent conductive metal oxide layer and the wire grid polarizing film 004 are set to be consistent in pattern.

Embodiment III

Figure 4:
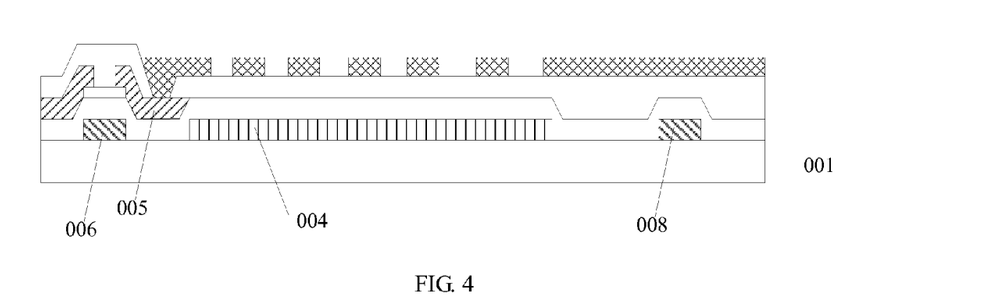
FIG. 4 is a structural schematic diagram of Embodiment III.

In an array substrate of the embodiment, as shown in FIG. 4, a common electrode and a wire grid polarizing film are the same. For example, the wire grid polarizing film 004 and the gate line 003 are arranged on a same layer, and the wire grid polarizing film 004 also functions as a common electrode in the respective pixel regions.

For example, during the fabrication of the ADS mode array substrate as shown in FIG. 4, the wire grid polarizing film 004 serving as the common electrode is formed along with the formation of the gate line 003 and the gate electrode 006, which can omit a common electrode separately formed on the drain electrode. Thus, the numbers of used masks and the fabrication processes can be reduced.

Embodiment IV

In the embodiment, a wire grid polarizing film can be connected with a pixel electrode, or can be connected with a common electrode line as a part of a storage capacitor.

For example, in the case that pixel electrodes is separately arranged in respective pixel regions, the wire grid polarizing films 004 can be electrically connected with the pixel electrodes in the respective pixel regions, to form a part of a storage capacitor, so as to increase storage capacitance and improve display resolution; alternatively, in the case that a common electrode line and a gate line are arranged on a same layer and extended in a same direction in an array substrate, the wire grid polarizing films 004 can be electrically connected with the common electrode lines in the respective pixel regions, to form a part of a storage capacitor, so as to increase storage capacitance and improve display resolution.

Figure 5:
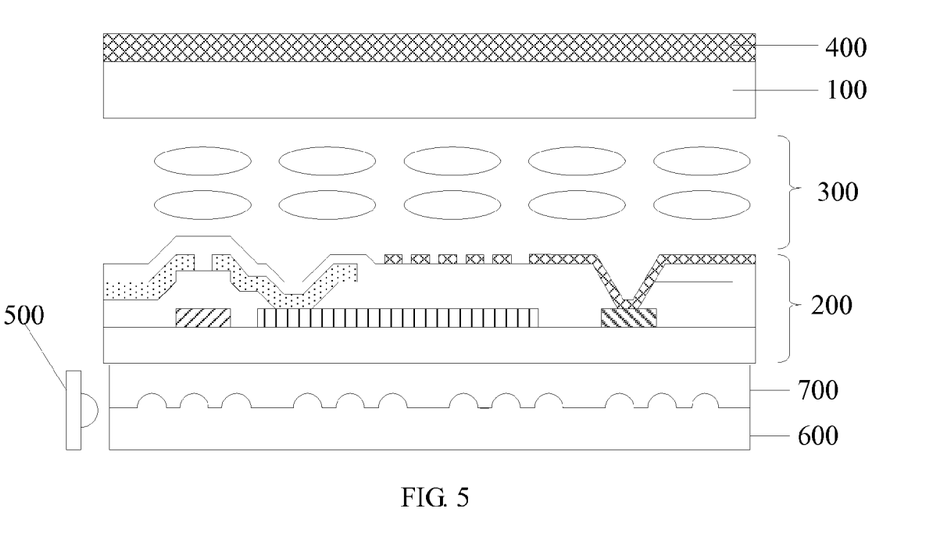
FIG. 5 is a structural schematic diagram of a liquid crystal panel provided by an embodiment of the disclosure.

The embodiment of the disclosure further provides a liquid crystal display panel, as shown in FIG. 5, comprising an opposed substrate 100 and an array substrate 200 opposite to each other, and a liquid crystal layer 300 filled in between the array substrate 200 and the opposed substrate 100.

The array substrate 200 is any array substrate provided by the embodiment of the present disclosure.

For example, the opposed substrate 100 is a color filter substrate, including a color filter unit corresponding to a pixel region on the array substrate 200, and further including a black matrix and so on.

For example, an upper polarizer 400 is arranged on a side of the opposed substrate 100 away from the array substrate 200.

For example, an extending direction of a grating structure of a wire grid polarizing film 004 in the array substrate 200 and a transmission axis direction of the upper polarizer 400 are parallel to each other. That is, in the array substrate 200, linearly polarized light passing through the wire grid polarizing film 004 and the linearly polarized light passing through the upper polarizer 400 are perpendicular to each other in polarization direction.

In addition, in the liquid crystal display panel provided by the embodiment of the present disclosure, as shown in FIG. 5, further comprising a backlight module arranged on an outer side of the array substrate. The backlight module includes a LED lamp component 500, a reflecting plate 600 and a light guiding plate 700. Of course, The backlight module can also include other components, which is not defined here.

The embodiment of the present disclosure further provides a display device, comprising any one of the liquid crystal display panels provided by the embodiments of the present disclosure. The display device can be any product or part having a display function, such as mobile phone, a watch, a tablet computer, a television, a monitor, a laptop, a digital photo frame and a navigator. For implementation of the display device, the embodiments of the above-described liquid crystal display panel can be referred to, and repeated parts will not be illustrated here.

The array substrate, the liquid crystal display panel and the display device provided by the embodiments of the present disclosure, the wire grid polarizing film in respective pixel regions of the array substrate is adopted to replace a polarizer attached on an outer side of the array substrate. The grating structure has a grating pitch less than half of the minimum wavelength of visible light is used in the wire grid polarizing films in respective pixel regions, to changing natural light passing therethrough into linearly polarized light. In the embodiments of the present disclosure, the wire grid polarizing film which plays a role of polarizer can be formed during the fabrication of the array substrate, without affecting normal display of the liquid crystal display panel. Therefore, a process of separately attaching a polarizer after cell-assembling is omitted, which can improve production efficiency, save production cost, and be conducive to thinning the display panel.

The foregoing embodiments merely are exemplary embodiments of the disclosure, and not intended to define the scope of the disclosure; modification or substitution which is easily thought by any person skilled in the art within the technical scope disclosed by the disclosure should fall into the protection scope of the disclosure. Therefore, the protection scope of the disclosure should be subject to the protection scope of the claims.

The present application claims priority of Chinese Patent Application No. 201410642435.6 filed on Nov. 7, 2014, the disclosure of which is incorporated herein by reference in its entirety as part of the present application.

The invention claimed is:

1. An array substrate, comprising:
a base substrate;
a data line and a gate line intersecting with each other on the base substrate, a plurality of pixel regions defined by the data line and the gate line on the array substrate and arranged in array; and
a wire grid polarizing film arranged in respective pixel regions and configured for changing natural light passing therethrough into linearly polarized light, wherein,
the wire grid polarizing film in the respective pixel regions has a grating structure, the wire grid polarizing film functions as a pixel electrode and a common electrode of an interdigital structure, a portion of the wire grid polarizing film functioning as the pixel electrode is electrically connected with a drain electrode of a thin film transistor located on an intersection of the data line and the gate line,
wherein, in the respective pixel regions, a transparent conductive metal oxide layer is arranged on the wire grid polarizing film, the transparent conductive metal oxide layer and the wire grid polarizing film are in direct contact with each other and identical in pattern.

2. The array substrate according to claim 1, wherein, the grating structure consists of metal wires arranged linearly.

3. The array substrate according to claim 1, wherein, the grating structure has a grating pitch less than half of a minimum wavelength of visible light.

4. The array substrate according to claim 1, wherein, the grating structure has a grating pitch of 60 nm-100 nm.

5. The array substrate according to claim 1, wherein the wire grid polarizing film and the data line or the gate line are arranged on a same layer and insulated from each other.

6. The array substrate according to claim 1, wherein, the drain electrode and the data line are arranged on a same layer.

7. The array substrate according to claim 1, wherein, the wire grid polarizing film functioning as the pixel electrode and the common electrode of the interdigital structure is arranged on a same layer as the data line.

8. The array substrate according to claim 1, wherein, the wire grid polarizing film and the gate line are arranged on a same layer.

9. The array substrate according to claim 1, further comprising a common electrode line arranged on a same layer as the gate line and extended in a same direction as the gate line; wherein, a portion of the wire grid polarizing film functioning as the common electrode is electrically connected with the common line in the respective pixel regions.

10. A liquid crystal display panel, comprising: an array substrate and an opposed substrate arranged oppositely, and a liquid crystal layer filled between the array substrate and the opposed substrate; wherein,
the array substrate is the array substrate according to claim 1.

11. The liquid crystal display panel according to claim 10, wherein, an upper polarizer is arranged on a side of the opposed substrate away from the array substrate.

12. The liquid crystal display panel according to claim 11, wherein, an extending direction of the grating structure of the wire grid polarizing film and a transmission axis direction of the upper polarizer are parallel to each other.

13. A display device, comprising the liquid crystal display panel according to claim 10.

\* \* \* \* \*